US008288052B2

(12) United States Patent
Kushibiki et al.

(10) Patent No.: US 8,288,052 B2
(45) Date of Patent: Oct. 16, 2012

(54) FUEL CELL

(75) Inventors: Keiko Kushibiki, Fujisawa (JP);
Fuminori Satou, Yokohama (JP); Naoki Hara, Yokohama (JP); Yasushi Nakajima, Kawasaki (JP); Shigeo Ibuka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1486 days.

(21) Appl. No.: 11/587,272

(22) PCT Filed: Apr. 14, 2005

(86) PCT No.: PCT/JP2005/007577
§ 371 (c)(1),
(2), (4) Date: Oct. 23, 2006

(87) PCT Pub. No.: WO2005/109557
PCT Pub. Date: Nov. 17, 2005

(65) Prior Publication Data
US 2007/0218341 A1   Sep. 20, 2007

(30) Foreign Application Priority Data

Apr. 30, 2004 (JP) ................................ 2004-135429

(51) Int. Cl.
*H01M 8/02* (2006.01)
(52) U.S. Cl. ......... 429/466; 429/456; 429/458; 429/457
(58) Field of Classification Search .................. 429/466, 429/456, 458
See application file for complete search history.

(56) References Cited

U.S. PATENT DOCUMENTS

| 5,158,837 | A | * | 10/1992 | Misawa et al. ................ 429/444 |
| 5,691,075 | A | | 11/1997 | Batawi |
| 5,922,485 | A | | 7/1999 | Enami |
| 6,432,567 | B1 | | 8/2002 | Doggwiler et al. |
| 2004/0247983 | A1 | * | 12/2004 | Orishima et al. ............... 429/38 |

FOREIGN PATENT DOCUMENTS

| EP | 0 749 171 A1 | 12/1996 |
| EP | 1 075 033 A1 | 2/2001 |
| EP | 1 445 814 A1 | 8/2004 |
| JP | 62-098567 A | 5/1987 |
| JP | 2002-008682 A | 1/2002 |
| JP | 2002-151106 A | 5/2002 |
| JP | 2002-203579 A | 7/2002 |
| WO | WO 99/67845 A1 | 12/1999 |
| WO | WO 03/012903 A1 | 2/2003 |
| WO | WO 03/043110 A1 | 5/2003 |

* cited by examiner

*Primary Examiner* — Jane Rhee
(74) *Attorney, Agent, or Firm* — Foley & Lardner LLP

(57) ABSTRACT

An aspect of the present invention provides a fuel cell that includes, hollow structural bodies each provided with an internal space for reacting a fuel gas and an oxidant gas, each hollow structural body including, a separator having a perimeter wall section that follows along a rim, a cell plate having an electricity-generating cell having its outer perimeter joined to the separator such that a space for a gas to flow through is formed between the separator and the cell plate, a gas supply manifold to supply one of the reactant gases, a gas discharge manifold to discharge the reactant gas, and a gas introducing flow passage to introduce said reactant gas from the gas supply manifold to the perimeter wall section of the separator, wherein the reactant gas introduced into the gas introducing passage flows from the vicinity of the perimeter wall section of the separator to the gas discharge manifold.

22 Claims, 6 Drawing Sheets

FUEL CELL

TECHNICAL FIELD

The present invention relates to a fuel cell. More specifically, the present invention relates to a solid oxide fuel cell configured to generate electricity by conducting an electrochemical reaction between a fuel gas and an oxidant gas through a solid oxide electrolyte.

BACKGROUND ART

In a fuel cell, hydrogen gas or other fuel gas and an oxidant gas containing oxygen are separated by an electrolyte disposed there-between and reacted with each other electrochemically through the electrolyte. Electric energy is extracted directly from electrodes provided on both sides of the electrolyte. Fuel cells are classified based on the type of electrolytic material used. Examples of the main types include phosphoric acid fuel cells (PAFC), molten carbonate fuel cells (MCFC), solid oxide fuel cells (SOFC), and solid polymer fuel cells (PECF).

Solid oxide fuel cells are easy to handle because they use a solid oxide material that is conductive with respect to oxygen ions as the electrolyte. Solid oxide fuel cells have a high electricity generating efficiency and discharge heat at high temperatures. Additionally, solid oxide fuel cells can use a wide range of gases as the fuel gas. For these reasons, solid oxide fuel cells are hopeful candidates for vehicle power source applications and onsite cogeneration system applications.

An example of a conventional solid oxide fuel cell is disclosed in Japanese Laid-open Patent Publication No. 2002-203579. That publication presents a fuel cell made by stacking electricity-generating cells and separators onto each other in an alternating fashion, each electricity-generating cell comprising an air electrode and a fuel electrode arranged on opposite sides of a solid electrolyte layer. The fuel gas is first introduced into a center section from the outside of a separator through a fuel supply passage. The fuel gas then moves along a slit from the center section and is dispensed toward the outside perimeter. The reaction is occurs as the fuel gas moves through the fuel cell.

DISCLOSURE OF THE INVENTION

In the fuel cell disclosed in the aforementioned publication, the fuel gas reacts as it flows from a circular disk-shaped center section toward an outer perimeter section. Consequently, the concentration of the hydrogen, hydrocarbon, or other electricity-generating fuel components in the fuel gas diminishes as the fuel gas moves from the center toward the outer perimeter. Meanwhile, further downstream the fuel gas flows toward the outer perimeter, the larger the surface area of the flow passage becomes. Consequently, the number of fuel gas molecules supplied per unit surface area is much smaller at the outer perimeter section downstream and, thus, the output density at the outer perimeter section is severely diminished.

If an excessive quantity of fuel gas is supplied in an attempt to ensure that a sufficient amount of fuel gas is delivered to the outer perimeter section, the electricity generation efficiency of the stack will increase but the quantity of fuel gas that is discharged without being used for generating electricity will also increase, thus lowering the fuel utilization efficiency. As a result, the overall electricity generation efficiency of the system, i.e., the product of the electricity generation efficiency of the stack and the fuel utilization efficiency, decreases, which is undesirable.

Furthermore, with the fuel cell disclosed in the aforementioned publication (Japanese Laid-open Patent Publication No. 2002-203579), the separators must be made with a large thickness because the fuel supply passage is configured such that after the fuel is guided to the center section, the fuel must be briefly turned in the stacking direction (thickness direction) at the center section before it can be dispensed toward the outer perimeter. Consequently, the number of stacked electricity-generating cells for a given stack volume cannot be increased and, thus, the output density for a given stack volume cannot be increased.

Moreover, with the fuel cell disclosed in the aforementioned publication, the heat capacity of the separators is large because the separators are thick. Consequently, the startup performance of the fuel cell is poor it is difficult to heat the fuel cell rapidly in order to raise the fuel cell to the operating temperature.

The present invention was conceived in order to solve these problems of the existing technology. The object of the invention is to provide a fuel cell configured such that the concentration of the fuel gas is sufficient even in the downstream portion of the fuel gas flow and the output density of the fuel cell is uniform, and also configured such that the separators are thin so that the number of electricity-generating cells can be increased and the output density for a given stack volume can be increased.

An aspect of the present invention provides a fuel cell that includes, a plurality of hollow structural bodies each provided with an internal space for reacting a fuel gas and an oxidant gas, each hollow structural body including, a separator having a perimeter wall section that follows along a rim and having a shape of a shallow container, a cell plate having an electricity-generating cell provided with an oxidant electrode on one side and a fuel electrode on the other side and having its outer perimeter joined to the perimeter wall section of the separator such that a space for a gas to flow through is formed between the separator and the cell plate, a gas supply manifold provided in the center sections of the cell plate and the separator and configured to supply one of the reactant gases, either the fuel gas or the oxidant gas, a gas discharge manifold provided in the center sections of the cell plate and the separator and configured to discharge said reactant gas, and at least one gas introducing flow passage configured and arranged to introduce said reactant gas from the gas supply manifold to the perimeter wall section of the separator, wherein the reactant gas introduced into the gas introducing passage is flows from the vicinity of the perimeter wall section of the separator to the gas discharge manifold.

BEST MODE FOR CARRYING OUT THE INVENTION

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

First Embodiment

Figure 1:
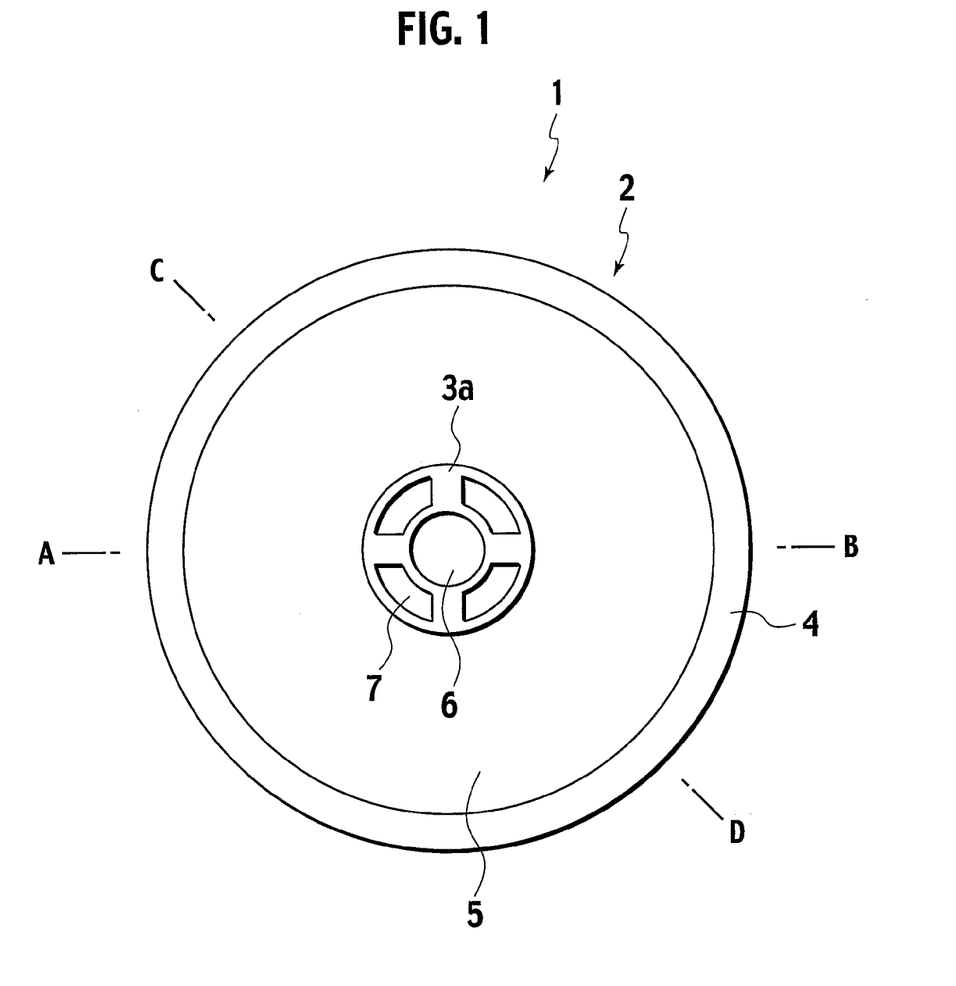
FIG. 1 is a plan view showing the hollow structural body of a fuel cell in accordance with the first embodiment.
Figure 2A:
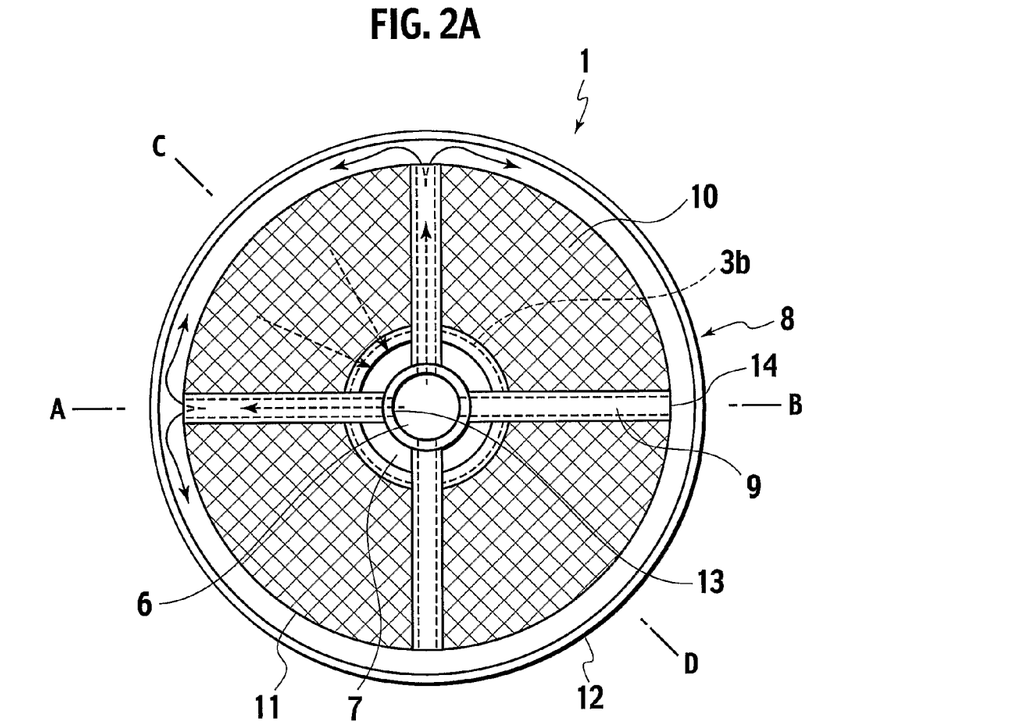
FIG. 2A is a plan view of the inside of the hollow structural body and FIGS. 2B and 2C are cross sectional views of the hollow structural body taken along section lines A-B and C-D, respectively.
Figure 2B:
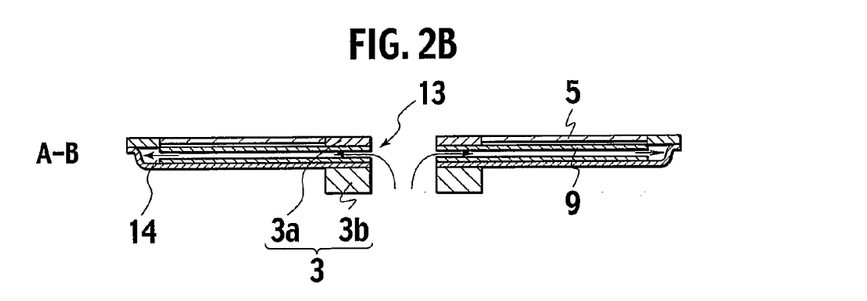
Figure 2C:
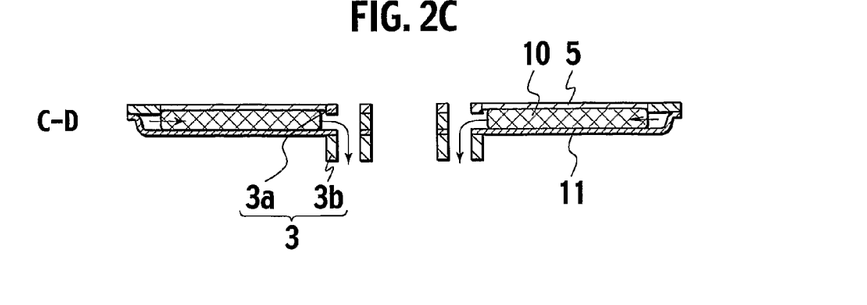

FIG. 1 is a plan view showing the hollow structural body of a fuel cell in accordance with the first embodiment. FIG. 2A is a plan view of the inside of the hollow structural body and FIGS. 2B and 2C are cross sectional views of the hollow structural body taken along section lines A-B and C-D, respectively. As shown in FIG. 1, the upper face of the hollow structural body 1 is made of a thin plate-like cell plate 2, and the cell plate 2 includes a metal cell plate manifold 3a, a metal outer rim section 4, and a donut-shaped electricity-generating cell 5 that are joined together.

The cell plate manifold 3a has a thickness of, for example, 1 millimeter and is provided with a gas introducing port 6 for introducing a fuel gas and a gas discharge port 7 for discharging the fuel gas. The electricity-generating cell 5 is an electrolyte support type cell and comprises a solid electrolyte layer, an oxidant electrode formed on one side of the solid electrolyte layer, and a fuel electrode formed on the other side of the solid electrolyte layer. The solid electrolyte layer is made of, for example, 8 mol % yttria-stabilized zirconia. An oxidant electrode made of, for example, $La_xSr_{1-x}CoO_3$ is baked onto one side of the solid electrolyte layer and a fuel electrode made of, for example, NiO—YSZ cermet is baked onto the opposite side of the solid electrolyte layer.

The inside of the hollow structural body 1 will now be described with reference to FIGS. 2A, 2B, and 2C. As shown in FIG. 2, the hollow structural body 1 comprises a thin plate-like separator 8 whose perimeter is surrounded an outer wall (perimeter wall section), a separator manifold 3b provided in a center section, rib flow passages (gas introducing flow passage) 9 that communicate with the gas introducing port 6, and fuel electrode collector layers 10 formed between the rib flow passages 9.

The separator 8 comprises a separator thin plate section 11 and a separator outer wall section 12 and is made of a heat-resistant metal, such as a ferrite stainless steel. The rib flow passages 9 and the separator manifold 3b are laid over the separator thin plate section 11 and joined thereto by a diffusion bonding method.

The separator thin plate section 11 is made of a piece of stainless steel sheet metal that has a thickness of, for example, 100 micrometers and has been press formed to have an external diameter of, for example, 125 millimeters and a separator outer wall section 12 having a height of, for example, 1 millimeter. The gas introducing port 6 and the gas discharge port 7 open at the center section of the separator thin plate section 11. The separator thin plate section 11 disperses the fuel gas dispensed at the separator outer wall section 12 to the electrode surface of the electricity-generating cell 5 and directs the flow of the fuel gas as the fuel gas flows toward the gas discharge port 7 at the center section. Also, the separator 8 is embossed or otherwise imparted with unevenness (not shown) in order to prevent warping.

The separator outer wall section 12 functions both to deflect and disperse the duel gas dispensed from the rib flow passages 9 with its inside face and to prevent warping of the separator 8. The separator outer wall section 12 also serves as a protrusion for maintaining the gas flow passage gap between the separator 8 and the cell plate 2 of the hollow structural body 1. The separator outer wall section 12 is joined to the outer rim section 4 of the cell plate 2 using, for example, laser welding so that a gas tight seal is formed there-between.

The separator manifold 3b is the portion of the center section of the separator 8 that is thicker than the separator thin plate section 11. The contacting surfaces of the cell plate manifold 3a and the separator manifold 3b are, for example, polished to a mirror finish. Together the cell plate manifold 3a and the separator manifold 3b form the manifold 3. In addition to polishing the contacting surfaces of the cell plate manifold 3a and the separator manifold 3b, it is also feasible to solder them together, join them together with glass-ceramic welding, or join them together with a ring-shaped metal or ceramic-glass gasket sandwiched there-between.

The manifold 3 functions to maintain the space between adjacent hollow structural bodies when the hollow structural body 1 is stacked. Additionally, the electrical insulation between adjacent hollow structural bodies at the manifolds 3 is maintained by treating the top and bottom ends of the manifolds 3 to make them electrically insulated before the hollow structural bodies 1 are stacked.

The rib flow passages 9 extend radially from the center section to the outer perimeter. The thickness of the rib flow passages 9 is, for example 1 millimeter and the portion thereof indicated with a broken line in FIG. 2A has the form of a recessed groove. The rib flow passages 9 are each provided with an introducing hole 13 that introduces fuel gas from the gas introducing port 6 of the manifold 3 and a dispensing hole 14 that dispenses the fuel gas at the separator outer wall section 12. The rib flow passages 9 function to guide the fuel gas from the center section to the outer perimeter section. Additionally, the rib flow passages 9 serve as crossbeams for the thin plate-like separator 8 and thus have the following effects: they prevent the separator 8 from warping due to thermal shock; they prevent the quality of the electrical contacts at the electrode surfaces of the electricity-generating cell 5 from declining; and they make it possible to reduce the weight of the separator 8 by making the separator 8 thinner. Since making the separator 8 thinner reduces the heat capacity, the rib flow passages 9 also make it possible to improve the startup performance. Also, the startup performance can also be improved by the fact that preheating can be accomplished while the fuel gas is passing through the rib flow passages 9.

Although FIG. 2B depicts a case in which the rib flow passages 9 do not contact the cell plates 2, it is also acceptable to configure the hollow structural body 1 such that the rib flow passages 9 contact the electrode surfaces of the electricity-generating cell 5 of the cell plate 2 either directly or through a porous collector layer made of metallic ferrite or the like. Since such an arrangement would make it possible to achieve a uniform electrical contact between the separator 3 and the fuel electrode collector layer 10 and the electrode layer on the surface of the electricity-generating cell 5, it would reduce the current collection loss of the generated output power and made it possible to increase the output density.

The rib flow passages 9 can easily be imparted with a modified catalyst function.

The fuel electrode collector layer 10 comprises a fine metal mesh made of stainless steel or other heat resistant metal or a foamed metal or other porous conductor that has been formed into a plate-like form. The fuel collector layer 10 is laminated such that it contacts both the separator thin plate section 11 and the electrode on the surface of the electricity-generating cell 5.

The flow of the fuel gas in the hollow structural body 1 of a fuel cell in accordance with this embodiment will now be described. The fuel gas is supplied to the gas introducing port 6 of the manifold 3 and introduced into the hollow structural body 1 through the introducing holes 13 of the rib flow passages 9. The fuel gas then flows through the recessed grooves of the rib flow passages 9 and the separator thin plate section 11 and is dispensed from the dispensing holes 14. The fuel gas is dispensed from the dispensing holes 14 in such a manner as to be blown against the separator outer wall section 12.

The fuel gas then flows along the separator outer wall section 12 and flows and disperses as it flows into the fuel electrode collector layer 10. As the fuel gas flows through the fuel electrode collector layer 10, it reacts with oxygen ions at the fuel electrode formed on the surface of the electricity-generating cell 5, thereby generating electricity. Finally the fuel gas is discharged from the gas discharge port 7 of the manifold 3. The concentration of the fuel gas decreases as the fuel gas reacts and, thus, the concentration of the fuel gas discharged from the gas discharge ports 7 is lower than the concentration of the fuel gas introduced through the gas introducing ports 6.

Figure 3:
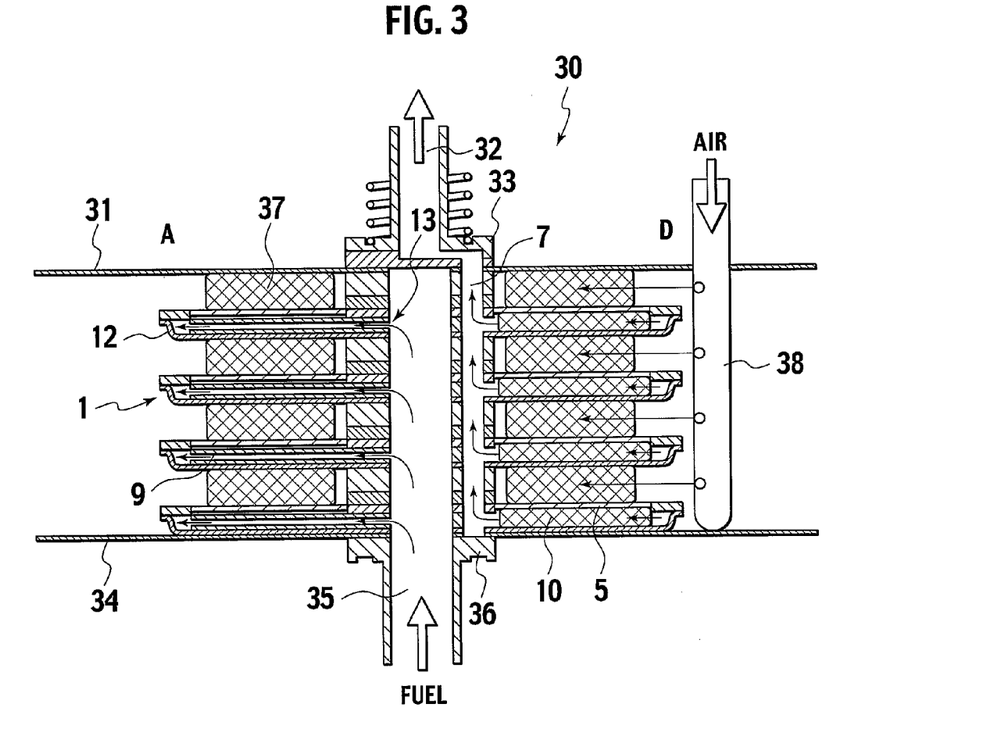
FIG. 3 is a cross sectional view of a stack made up of hollow structural bodies 1 stacked onto each other and corresponds to the A-D cross section of FIG. 2A.

A stack made up of stacked hollow structural bodies 1 will now be described with reference to FIG. 3. FIG. 3 is a cross sectional view of a stack made up of hollow structural bodies 1 stacked onto each other and corresponds to the A-D cross section of FIG. 2A. In FIG. 3, the left-hand side corresponds to the A-B cross section shown in FIG. 2B and the right-hand side corresponds to the C-D cross section shown in FIG. 2C. As shown in FIG. 3, the stack 30 comprises a plurality of stacked hollow structural bodies 1, an upper flow redirecting plate 31 configured to redirect the flow of the oxidant gas at the upper surface of the hollow structural bodies 1, an upper end manifold 33 provided with a post-reaction gas discharge port 32, a lower flow redirecting plate 34 configured to direct the flow of the oxidant gas at the lower surface of the hollow structural bodies 1, a lower end manifold 36 provided with a fuel gas supply port 35, an oxidant electrode collector layer 37 formed on the surface of the oxidant electrode of the electricity-generating cell 5 of each hollow structural body 1, and a sprayer 38 configured to spray the oxidant gas into the oxidant electrode collector layers 37 in a shower-like fashion.

An electrically insulating ceramic coating layer is formed on the bottom face of the manifold 3 of each hollow structural body 1, and a solder layer for joining the hollow structural body 1 to the adjacent hollow structural body 1 is formed in a double ring pattern.

The upper end manifold 33 and the lower end manifold 36 are arranged above and below the stacked hollow structural bodies 1 with the upper flow redirecting plate 31 and the lower flow redirecting plate 34 disposed there-between. The stack 30 is completed by applying pressure to press fit the upper end manifold 33 and the lower end manifold 36.

The flow of the fuel gas and the oxidant gas in the stack 30 will now be described. First, the fuel gas is supplied through the fuel gas supply port 35 and introduced into the rib flow passages 9 through the introducing holes 13 of the hollow structural bodies 1. Then, the fuel gas passes through the rib flow passages 9 and is blown against the separator outer wall section 12 of each hollow structural body 1 from the dispensing holes 14. The fuel gas flows along the separator outer wall section 12 and into the fuel electrode collector layer 10, where it reacts with oxygen ions at the fuel electrode formed on the surface of the electricity-generating cell 5, thereby generating electricity. Fuel gas that has finished reacting is discharged to the discharge ports 7. The post-reaction fuel gas that is discharged from all of the hollow structural bodies 1 is gathered and discharged to the outside of the stack 30 from the post-reaction gas discharge port 32.

Figure 4:
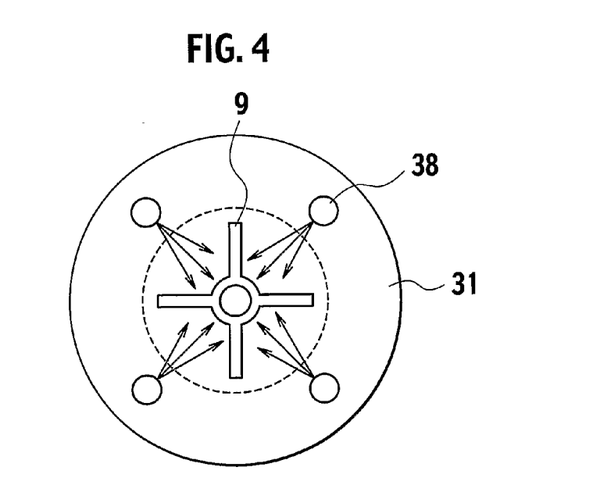
FIG. 4 is a plan view for explaining the flow of the oxidant gas in a stack obtained by stacking fuel cell hollow structural bodies that are in accordance with the first embodiment of the present invention.

FIG. 4 is a plan view for explaining the flow of the oxidant gas in a stack obtained by stacking fuel cell hollow structural bodies that are in accordance with the first embodiment of the present invention. The oxidant gas is sprayed from the sprayer 38 toward the laminated oxidant electrode collector layers 37 in a shower-like fashion. As shown in FIG. 4, the sprayer 38 is arranged such that it sprays the oxidant gas between the rib flow passages 9.

Although in this embodiment, the fuel gas is introduced into the inside of the hollow structural body 1 and the oxidant gas is sprayed with a sprayer 38, it is also acceptable to configure the stack such that the oxidant gas is introduced into the inside of the hollow structural body 1 and the fuel gas is sprayed from a sprayer 38. However, in such a case, it is necessary to install the stack 30 inside a fuel flow passage having excellent gas tightness and thermal insulating properties.

As described previously, a fuel cell in accordance with this embodiment is configured such that the fuel gas is introduced from the center section to the outer perimeter section through the rib flow passages 9 and the introduced fuel gas reacts with the electricity-generating cell 5 and generates electricity as it flows from the outer perimeter section toward the center section. As a result, although the concentration of the fuel gas decreases as the fuel gas moves toward the center section, the surface area of the flow passage also decreases and offsets the decrease in the concentration of the fuel gas. Also, the increase in the speed of the fuel gas as it moves toward the center section accelerates the reaction. Consequently, the output density is more uniform across the cell plate 2. Thus, the electric power output and the accompanying heating value can also be made uniform.

Additionally, since the cell plate 2 and the separator 8 each have the form of a thin plate and the fuel gas introduced to the outer perimeter section through the rib flow passages 9 moves horizontally from the outer perimeter section to the manifold 3 of the center section, the fuel gas moves within the same horizontal plane inside the hollow structural body 1 and, thus, the hollow structural body 1 can be made thinner As a result, the number of stacked hollow structural bodies 1 can be increased and the output density for a given stack volume can be increased.

Also, in a fuel cell in accordance with this embodiment, dispensing holes 14 are provided at the ends of the rib flow passages 9 to dispense the fuel gas in such a manner that it is blown against the separator outer wall section 12. After striking the outer wall section 12, the fuel gas spreads along the separator outer wall section 12. As a result, the fuel gas can be evenly dispersed over a wide area, enabling a uniform electric power generation density to be obtained. Additionally, since damage caused by localized heating can be prevented, a fuel cell with excellent reliability and durability can be provided.

Since the upstream portion of the flow of fuel gas is not located near the manifold 3, localized overheating in the vicinity of the manifold 3 can be prevented and the durability of the joints between hollow structural bodies can be improved. This is important because good electrical insulation and gas tightness need to be maintained at the joints.

Since the uniformity of the output distribution across the electricity-generating cell 5 is improved, the temperature distribution across the electricity-generating cell 5 can also be made more uniform. As a result, thermal stresses are reduced and a stack having excellent durability can be obtained.

Second Embodiment

Figure 5A:
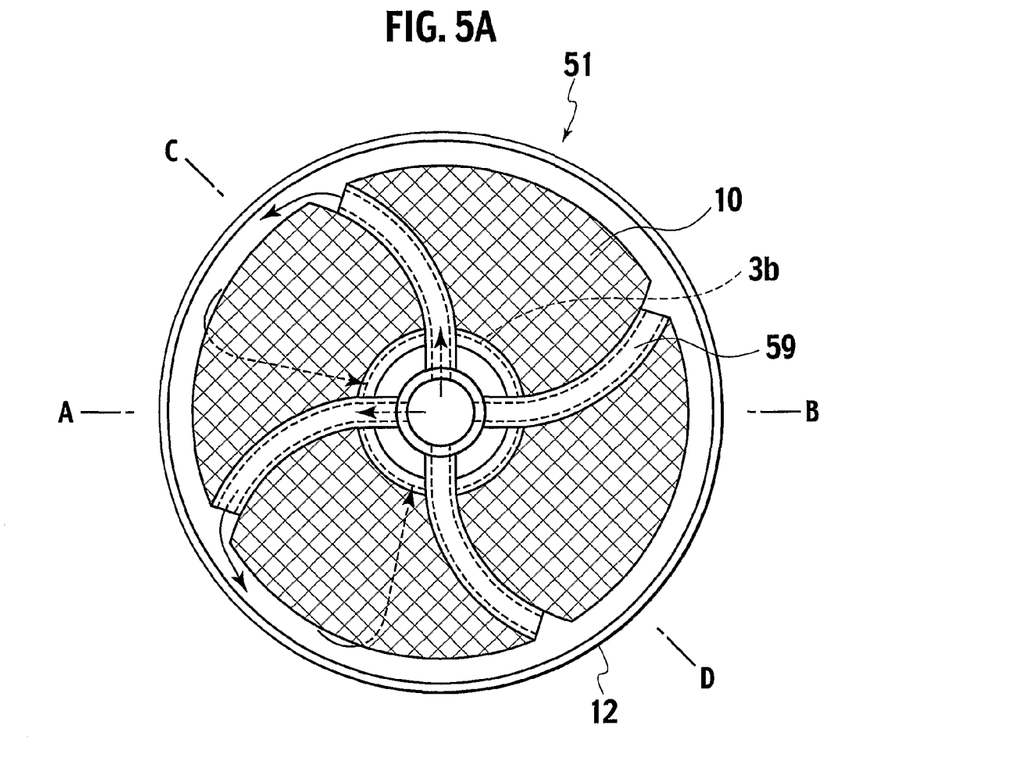
FIG. 5A is a plan view showing the inside of a hollow structural body in accordance with this embodiment.
Figure 5B:
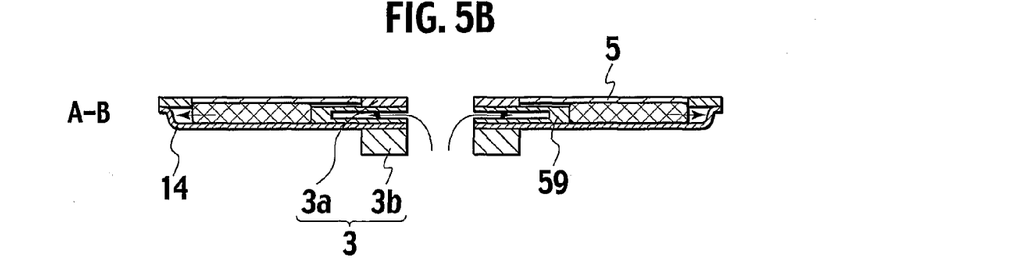
FIGS. 5B and 5C are cross sectional views of the hollow structural body taken along section lines A-B and C-D.
Figure 5C:
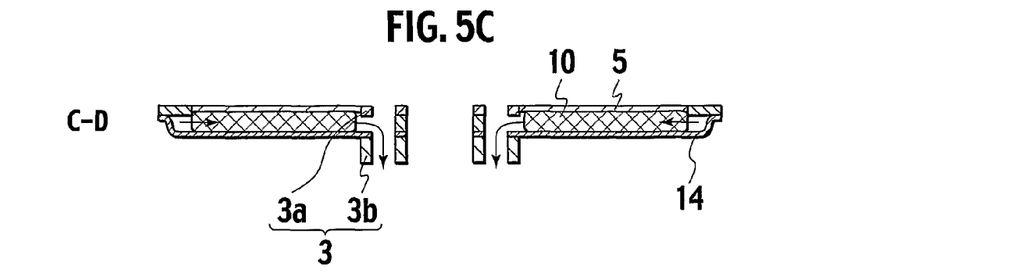

A second embodiment of a fuel cell in accordance with the present invention will now be described with reference to FIGS. 5A, 5B, and 5C. FIG. 5A is a plan view showing the inside of a hollow structural body in accordance with this embodiment. FIGS. 5B and 5C are cross sectional views of the hollow structural body taken along section lines A-B and C-D. In the hollow structural body 51 of this embodiment, the rib flow passages 59 are different from the rib flow passages 9 of the first embodiment. Otherwise, the constituent features are the same as the first embodiment.

While the rib flow passages 9 of the first embodiment are configured to dispense the fuel gas in such a manner that the fuel gas hits the separator outer wall section 12 orthogonally, in this embodiment the rib flow passages 59 dispense the fuel gas in such a manner that the fuel gas hits the separator outer wall section 12 at a slanted angle.

Thus, in a fuel cell in accordance with the second embodiment, since the rib flow passages 59 dispense the fuel gas in such a manner that the fuel gas hits the separator outer wall section 12 at a slanted angle, a flow of fuel gas that follows along the separator outer wall section 12 can be created and, as a result, the fuel gas can be evenly dispersed over a wide area, enabling a uniform electric power generation density to be obtained.

Third Embodiment

Figure 6A:
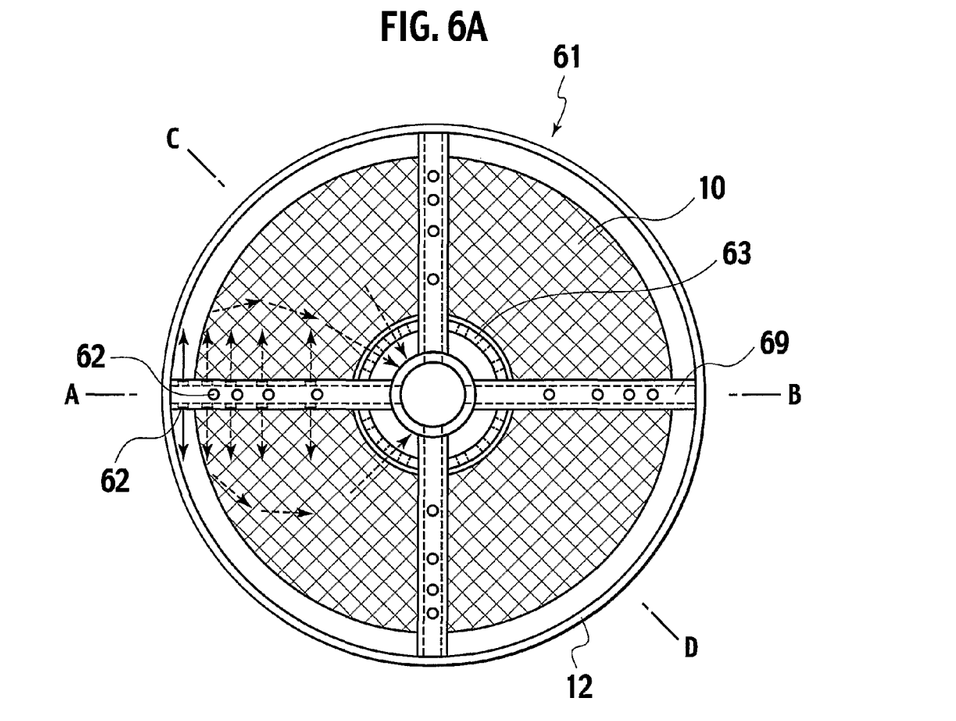
FIG. 6A is a plan view showing the inside of a hollow structural body in accordance with this embodiment.
Figure 6B:
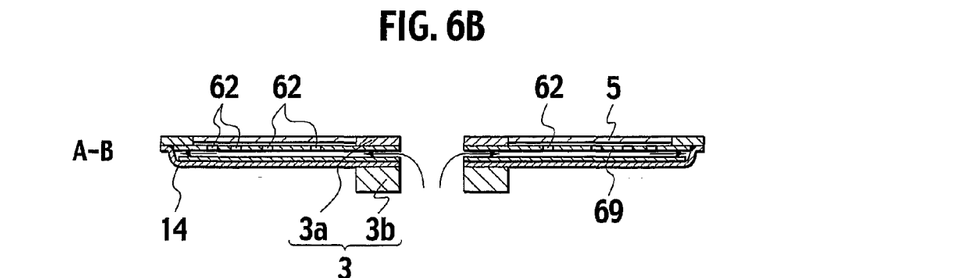
FIGS. 6B and 6C are cross sectional views of the hollow structural body taken along section lines A-B and C-D.
Figure 6C:
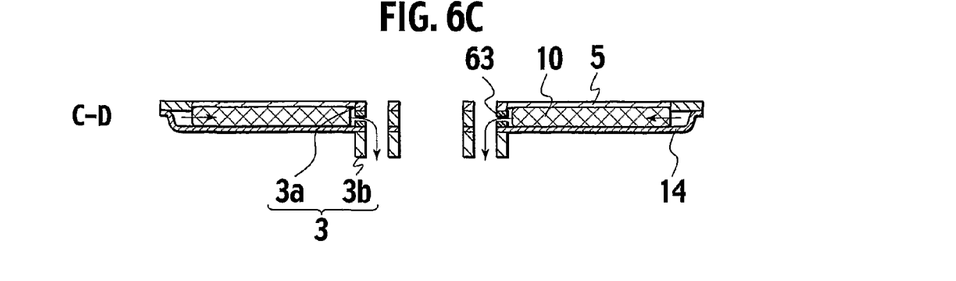

A third embodiment of a fuel cell in accordance with the present invention will now be described with reference to FIGS. 6A, 6B, and 6C. FIG. 6A is a plan view showing the inside of a hollow structural body in accordance with this embodiment. FIGS. 6B and 6C are cross sectional views of the hollow structural body taken along section lines A-B and C-D. In the hollow structural body 61 of this embodiment, the dispensing holes 62 of the rib flow passages 69 are different and the fact that the separator manifold 3a is provided with an outer ring 63 is different. Otherwise, the constituent features are the same as the first embodiment.

The separator manifold 3a of this embodiment is provided with an outer ring 63. The outer ring 63 makes it possible to support the manifold 3 on the bottom of the hollow structural body 1, to support the rib flow passage 69, to improve the quality of the diffusion bond, and to prevent warping.

The rib flow passages 69 of this embodiment are provided with dispensing holes 62 on the side faces and upper faces thereof. While the rib flow passages 9 of the first embodiment are provided with dispensing holes 14 in the tip ends thereof to dispense fuel gas toward the separator outer wall section 12, the rib flow passages 69 of this embodiment are provided with dispensing holes 62 on the side faces and upper face thereof to dispense fuel gas upward and to the sides. Additionally, rib flow passages 69 are configured such that the size and number of the dispensing holes 62 increase as one moves from the center section toward the outer perimeter, thereby enabling the amount of fuel gas dispensed to be increased as the fuel gas flows toward the outer perimeter section. Although FIG. 6 illustrates a case in which dispensing holes 62 are provided in both the upper face and the side faces of the rib flow passages 69, it is also acceptable to provide dispensing holes 62 only in the upper face or only in the side faces.

Thus with a fuel cell according to this embodiment, since dispensing holes 62 are provided in the side faces and/or upper face of the rib flow passages 69 and can be arranged and configured such that the amount of gas dispensed increases as one moves from the center section to the outer perimeter section, the reactions that occur at the electricity-generating cell 5 can be conducted more uniformly by adjusting the number and size of the dispensing holes 62.

Fourth Embodiment

Figure 7A:
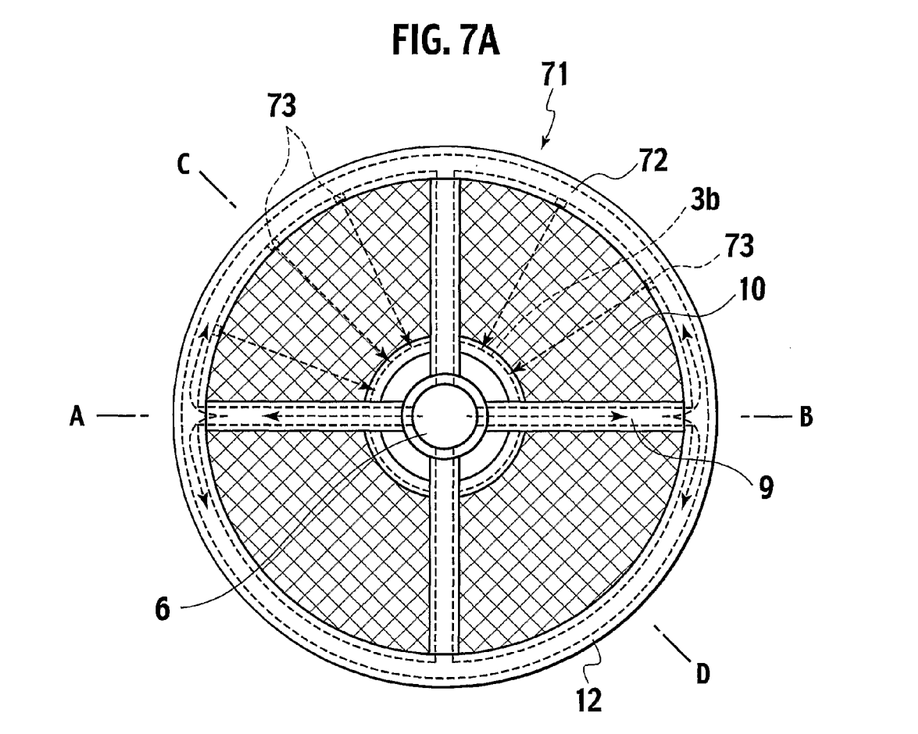
FIG. 7A is a plan view showing the inside of a hollow structural body in accordance with this embodiment.
Figure 7B:
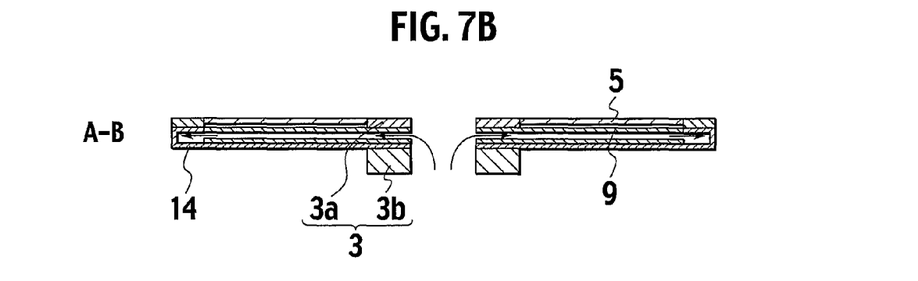
FIGS. 7B and 7C are cross sectional views of the hollow structural body taken along section lines A-B and C-D.
Figure 7C:
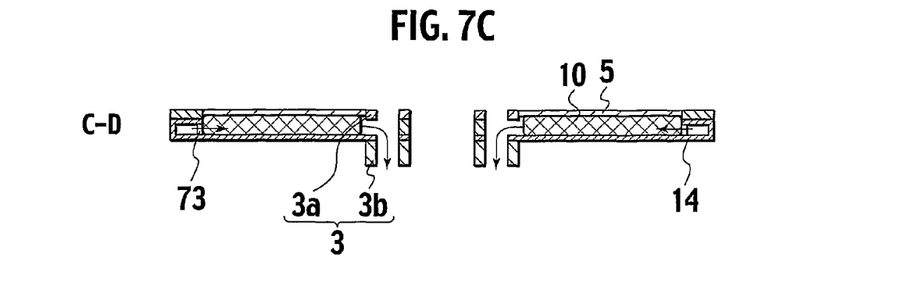

A fourth embodiment of a fuel cell in accordance with the present invention will now be described with reference to FIG. 7. FIG. 7A is a plan view showing the inside of a hollow structural body in accordance with this embodiment. FIGS. 7B and 7C are cross sectional views of the hollow structural body taken along section lines A-B and C-D. As shown in FIG. 7, the hollow structural body 71 of this embodiment is different from that of the first embodiment in that it is provided with an outer ring flow passage 72. Otherwise, the constituent features are the same as the first embodiment.

In this embodiment, the fuel gas introduced into the rib flow passages 9 is supplied to the outer ring flow passage 72 and flows through the inside of the outer ring flow passage 72. The fuel gas is dispensed from dispensing holes 73 provided in the outer ring flow passage 72 and spreads to the surface of the electricity-generating cell 5.

Although FIG. 7 illustrates a case in which the fuel gas is dispensed horizontally from the outer ring flow passages 72, it is also acceptable to provide a space between the outer ring flow passage 72 and the cell plate 2 and provide dispensing holes in the upper face of the outer ring flow passage 72 so that the fuel gas is dispensed vertically. It is also acceptable to provide dispensing holes in the side faces and/or the upper face of the rib flow passages 9 so that fuel gas is dispensed from there in addition to the dispensing holes provided in the outer ring flow passage 72.

Thus, with a fuel cell in accordance with this embodiment, since the fuel gas is dispensed from dispensing holes 73 provided in the outer ring flow passage 72, the distribution of the fuel gas can be balanced in the outer ring flow passage 72 even if the distribution of fuel gas to the rib flow passages 9 that run radially outward from the gas introducing ports 6 of the center section has become uneven, such as when the flow rate of the supplied gases is changed while operating the fuel cell.

In the embodiments described heretofore, the hollow structural body 1 has the shape of a circular disk, but it is also acceptable for the hollow structural body 1 to have a square shape or other polygonal shape instead of a circular disk shape. Additionally, it is also acceptable to increase the number of rib flow passages 9 and/or to change the number and/or shape of the introducing ports and discharge ports formed in the manifold 3.

The fuel cells presented in the embodiments are configured such that one of the reactant gasses, i.e., either the fuel gas or the oxidant gas, is introduced from the center section to the outer wall via gas introducing flow passages and, thus introduced, the reactant gas contacts the cell plate (electricity-generating cell) as it flows from the outer perimeter section to the manifold of the center section. In this way, both the concentration of the fuel gas and the surface area of the flow passage decrease as the fuel gas moves toward the center section and the smaller surface area of the flow passage offsets the decrease in the concentration of the fuel gas. Meanwhile, the increase in the speed of the fuel gas as it moves toward the center section accelerates the reaction. As a result, the output density can be made more uniform across the cell plate.

Since the separator and the cell plate each have the form of a thin plate, the fuel gas introduced from the center section to the outer perimeter section through the gas introducing flow passages moves horizontally from the outer perimeter section to the manifold of the center section. As a result, the fuel gas can be made to move within the same horizontal plane the entire time it is inside the hollow structural body and, thus, the hollow structural body can be made thinner. As a result, the number of stacked hollow structural bodies can be increased and the output density for a given stack volume can be increased.

The entire contents of Japanese patent application P2004-135429 filed Apr. 30, 2004 are hereby incorporated by reference.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

INDUSTRIAL APPLICABILITY

The following are examples of applications in which the present invention can be applied: fuel cell automobiles, railroad vehicles capable of traveling through areas where electric power service is not available, and stationary fuel cell systems.

The invention claimed is:

1. A fuel cell comprising:
a plurality of hollow structural bodies each provided with an internal space configured and arranged to react a fuel gas and an oxidant gas, each hollow structural body comprising:
 a separator having a perimeter wall section that follows along a rim and having a shape of a shallow container;
 a cell plate having an electricity-generating cell provided with an oxidant electrode on one side and a fuel electrode on the other side and having its outer perimeter joined to the perimeter wall section of the separator such that a space for a gas to flow through is formed between the separator and the cell plate;
 a gas supply manifold provided in the center sections of the cell plate and the separator, the gas supply manifold configured and arranged to supply one of the reactant gases, either the fuel gas or the oxidant gas;
 a gas discharge manifold provided in the center sections of the cell plate and the separator, the gas discharge manifold configured and arranged to discharge said reactant gas; and
 at least one gas introducing flow passage configured and arranged to introduce said reactant gas from the gas supply manifold to the perimeter wall section of the separator with said reactant gas being isolated from the electricity-generating cell,
wherein said reactant gas introduced into the gas introducing flow passage flows from the vicinity of the perimeter wall section of the separator through a collector layer to the gas discharge manifold.

2. The fuel cell of claim 1, wherein
the gas introducing flow passage has a dispensing hole in the tip end of the gas introducing flow passage, and the dispensing hole is configured and arranged such that said reactant gas dispensed there-from is blown against the perimeter wall section of the separator.

3. The fuel cell of claim 2, wherein
the gas introducing flow passage is configured and arranged such that said reactant gas introduced therethrough is blown against the inside surface of the perimeter wall section of the separator at a slanted angle.

4. The fuel cell of claim 3, wherein
a plurality of dispensing holes is provided in a wall face of the gas introducing flow passage, wherein the plurality of dispensing holes is configured and arranged such that the amount of reactant gas dispensed increases in a direction from the center section of the separator toward the outer perimeter section.

5. The fuel cell of claim 4, wherein
the number of dispensing holes per unit length of the gas introducing flow passage increases as one moves from the center section of the separator toward the outer perimeter section.

6. The fuel cell of claim 5, wherein
the separator has a ring-shaped outer ring flow passage provided in the outermost perimeter section,
the gas introducing flow passage is configured and arranged such that the gas introduced thereto is supplied to the outer ring flow passage, and
the outer ring flow passage is configured and arranged to dispense the gas that is supplied thereto.

7. The fuel cell of claim 6, wherein
the plurality of hollow structural bodies are stacked onto one another and said reactant gas is supplied to the gas supply manifolds of the hollow structural bodies from a common gas supply port.

8. The fuel cell of claim 7, further comprising
an upper redirecting plate configured and arranged to redirect the flow of said reactant gas at the uppermost surface of the stacked hollow structural bodies;
an upper end manifold provided with a post-reaction gas discharge port and configured and arranged to release reactant gas discharged from the gas discharge manifolds;
a lower redirecting plate configured and arranged to redirect the flow of said reactant gas at the lower most surface of the stacked hollow structural bodies;
a lower end manifold provided with a gas supply port configured and arranged to deliver said reactant gas to the gas supply manifolds;
electrode collector layers formed on the surface of the oxidant electrode or the fuel electrode of the electricity-generating cell of each of the hollow structural bodies; and
a sprayer configured and arranged to spray the other reactant gas, either the oxidant gas or the fuel gas, into the electrode collector layers.

9. The fuel cell of claim 4, wherein
the opening size of the dispensing holes increases as one moves from the center section of the separator toward the outer perimeter section.

10. The fuel cell of claim 9, wherein
the separator has a ring-shaped outer ring flow passage provided in the outermost perimeter section and the gas introducing flow passage is configured and arranged such that the gas introduced thereto is supplied to the outer ring flow passage, the outer ring flow passage being configured and arranged to dispense the gas that is supplied thereto.

11. The fuel cell of claim 10, wherein
the plurality of hollow structural bodies are stacked onto one another and said reactant gas is supplied to the gas supply manifolds of the hollow structural bodies from a common gas supply port.

12. The fuel cell of claim 11, further comprising
an upper redirecting plate configured and arranged to redirect the flow of said reactant gas at the uppermost surface of the stacked hollow structural bodies;
an upper end manifold provided with a post-reaction gas discharge port and configured and arranged to release reactant gas discharged from the gas discharge manifolds;
a lower redirecting plate configured and arranged to redirect the flow of said reactant gas at the lowermost surface of the stacked hollow structural bodies;
a lower end manifold provided with a gas supply port configured and arranged to deliver said reactant gas to the gas supply manifolds;
electrode collector layers formed on the surface of the oxidant electrode or the fuel electrode of the electricity-generating cell of each of the hollow structural bodies; and
a sprayer configured and arranged to spray the other reactant gas, either the oxidant gas or the fuel gas, into the electrode collector layers.

13. The fuel cell of claim 1, wherein
the gas introducing flow passage is configured and arranged such that said reactant gas introduced therethrough is blown against the inside surface of the perimeter wall section of the separator at a slanted angle.

14. The fuel cell of claim 1, wherein
a plurality of dispensing holes is provided in a wall face of the gas introducing flow passage, wherein the plurality of dispensing holes is configured and arranged such that the amount of reactant gas dispensed increases in a direction from the center section of the separator toward the outer perimeter section.

15. The fuel cell of claim 14, wherein
the number of dispensing holes per unit length of the gas introducing flow passage increases as one moves from the center section of the separator toward the outer perimeter section.

16. The fuel cell of claim 14, wherein
the opening size of the dispensing holes increases as one moves from the center section of the separator toward the outer perimeter section.

17. The fuel cell of claim 14, wherein
the separator has a ring-shaped outer ring flow passage provided in the outermost perimeter section and the gas introducing flow passage is configured and arranged such that the gas introduced thereto is supplied to the outer ring flow passage, the outer ring flow passage being configured and arranged to dispense the gas that is supplied thereto.

18. The fuel cell of claim 1, wherein
the plurality of hollow structural bodies are stacked onto one another and said reactant gas is supplied to the gas supply manifolds of the hollow structural bodies from a common gas supply port.

19. The fuel cell of claim 1, further comprising
an upper redirecting plate configured and arranged to redirect the flow of said reactant gas at the uppermost surface of stacked hollow structural bodies;
an upper end manifold provided with a post-reaction gas discharge port and configured and arranged to release reactant gas discharged from the gas discharge manifolds;
a lower redirecting plate configured and arranged to redirect the flow of said reactant gas at the lowermost surface of the stacked hollow structural bodies;
a lower end manifold provided with a gas supply port configured and arranged to deliver said reactant gas to the gas supply manifolds;
electrode collector layers formed on the surface of the oxidant electrode or the fuel electrode of the electricity-generating cell of each of the hollow structural bodies; and
a sprayer configured and arranged to spray the other reactant gas, either the oxidant gas or the fuel gas, into the electrode collector layers.

20. A fuel cell comprising:
a plurality of hollow structural bodies each provided with an internal space for reacting a fuel gas and an oxidant gas, each hollow structural body comprising:
a separator having a perimeter wall section that follows along a rim and having a shape of a shallow container;
a cell plate having an electricity-generating cell provided with an oxidant electrode on one side and a fuel electrode on the other side and having its outer perimeter joined to the perimeter wall section of the separator such that a space for a gas to flow through is formed between the separator and the cell plate;
a gas supply manifold means provided in the center sections of the cell plate and the separator, the gas supply manifold means for supplying one of the reactant gases, either the fuel gas or the oxidant gas;
a gas discharge manifold means provided in the center sections of the cell plate and the separator, the gas discharge manifold means for discharging said reactant gas; and
at least one gas introducing flow passage means for introducing said reactant gas from the gas supply manifold means to the perimeter wall section of the separator with said reactant gas being isolated from the electricity-generating cell,
wherein said reactant gas introduced into the gas introducing flow passage means flows from the vicinity of the perimeter wall section of the separator through a collector layer to the gas discharge manifold means.

21. The fuel cell of claim 1, wherein said gas introducing flow passage is configured to communicate the gas supply manifold with the collector layer.

22. The fuel cell of claim 21, wherein the collector layer is configured to react the fuel gas and the oxidant gas.

* * * * *